United States Patent
Park (10) Patent No.: US 10,526,826 B2
(45) Date of Patent: Jan. 7, 2020

(54) INTERLOCK DEVICE OF RING MAIN UNIT

(71) Applicant: LSIS CO., LTD., Gyeonggi-do (KR)

(72) Inventor: Jinhyun Park, Gyeonggi-do (KR)

(73) Assignee: LSIS CO., LTD., Gyeonggi-do (KR)

( * ) Notice: Subject to any disclaimer, the term of this patent is extended or adjusted under 35 U.S.C. 154(b) by 807 days.

(21) Appl. No.: 15/209,577

(22) Filed: Jul. 13, 2016

(65) Prior Publication Data

US 2017/0016256 A1    Jan. 19, 2017

(30) Foreign Application Priority Data

Jul. 14, 2015 (KR) .................. 20-2015-0004744 U (51) Int. Cl.
| | | |
|---|---|---|
| *E05C 19/02* | (2006.01) | |
| *H01H 9/22* | (2006.01) | |
| *E05C 19/00* | (2006.01) | |
| *E05C 1/08* | (2006.01) | |
| *H02B 13/02* | (2006.01) | |
| *H02B 7/06* | (2006.01) | |

(52) U.S. Cl.
CPC ............ *E05C 19/009* (2013.01); *E05C 1/085* (2013.01); *E05C 19/028* (2013.01); *H01H 9/22* (2013.01); *H02B 7/06* (2013.01); *H02B 13/02* (2013.01); *Y10S 292/11* (2013.01); *Y10T 292/0969* (2015.04); *Y10T 292/1099* (2015.04)

(58) Field of Classification Search
CPC .......... Y10T 292/0969; Y10T 292/097; Y10T 292/0995; Y10T 292/0997; Y10T 292/1099; Y10S 292/11; Y10S 292/61; Y10S 292/63; Y10S 292/68
See application file for complete search history.

(56) References Cited

U.S. PATENT DOCUMENTS

| 195,223 | A | * | 9/1877 | Miller ..................... E05B 63/20 292/163 |
| 2,831,734 | A | * | 4/1958 | Rapoport ................ E04G 7/305 292/175 |
| 3,233,932 | A | * | 2/1966 | Utterback ................ E05C 1/04 292/175 |
| 3,889,993 | A | * | 6/1975 | Bright ..................... E05C 1/04 174/38 |
| 4,138,150 | A | * | 2/1979 | Bills ................... E05B 65/0864 292/60 |

(Continued)

FOREIGN PATENT DOCUMENTS

| CN | 201498907 U | 6/2010 |
| CN | 202353077 | 7/2012 |

(Continued)

OTHER PUBLICATIONS

Office Action dated Jun. 6, 2017 for Japanese Application No. No. 2016-138356, in 2 pages.

(Continued)

*Primary Examiner* — Carlos Lugo
(74) *Attorney, Agent, or Firm* — K&L Gates LLP (57) ABSTRACT

An interlock device of a ring main unit configured to be attached to an inner frame of the ring main unit controls an attachment and detachment of a cable cover using a spring, thereby including an effect of facilitating the attachment and detachment of the cable cover through an elastic force of the spring.

10 Claims, 10 Drawing Sheets

(56) References Cited

U.S. PATENT DOCUMENTS

| | | | | |
|---|---|---|---|---|
| 4,161,804 | A | * | 7/1979 | D'Hooge ................ A62C 2/12 16/48.5 |
| 4,699,406 | A | * | 10/1987 | Swanson, Jr. ....... E05B 65/0864 292/175 |
| 4,718,704 | A | * | 1/1988 | Verhoog, Jr. ............ E05C 1/14 292/169 |
| 4,793,438 | A | * | 12/1988 | Perry ...................... E04G 1/20 182/112 |
| 4,997,218 | A | * | 3/1991 | Culling ................ E05B 63/125 292/302 |
| 5,104,163 | A | * | 4/1992 | Palmer, Jr. ............. E05B 63/24 292/148 |
| 5,390,761 | A | * | 2/1995 | Perry ...................... E04G 1/20 182/118 |
| 6,095,574 | A | * | 8/2000 | Dean .................. E05B 73/0082 292/164 |
| 6,126,211 | A | * | 10/2000 | Dominquez ........ E05B 65/0864 292/174 |
| 8,777,279 | B2 | * | 7/2014 | Kothy ................ E05B 17/2084 292/137 |
| 2015/0102608 | A1 | | 4/2015 | Kim et al. |

FOREIGN PATENT DOCUMENTS

| | | |
|---|---|---|
| CN | 202840331 | 3/2013 |
| CN | 203552983 | 4/2014 |
| CN | 203826789 U | 9/2014 |
| CN | 104638538 A | 5/2015 |
| JP | S55-087112 U | 12/1953 |
| JP | S63-058439 U | 4/1988 |
| JP | 03-013680 | 1/1991 |
| JP | 2003013680 A | 1/2003 |
| JP | 2003307295 | 10/2003 |
| JP | 2012115025 A | 6/2012 |
| KR | 20-1999-0003422 | 1/1999 |
| KR | 20-0214270 | 2/2001 |
| KR | 100802093 | 2/2008 |
| KR | 10-0894162 | 4/2009 |
| KR | 10-0970274 | 7/2010 |
| KR | 10-0995277 | 11/2010 |
| KR | 10-1306347 | 9/2013 |
| KR | 20140134134 | 11/2014 |

OTHER PUBLICATIONS

Japanese Notice of Allowance for related Japanese Application No. 2016-138356; action dated Dec. 19, 2017; (1 page).

Chinese Office Action for related Chinese Application No. 201610547495.9; action dated Nov. 1, 2017; (5 pages).

Extended Search Report from European Application No. 16176915.3 dated Nov. 18, 2016 in 8 pages.

Search Report from Korean App. No. 02-6915-6362 dated Oct. 8, 2015 in 4 pages.

Office Action in Korean Application No. 20-2015-0004744 dated Jan. 18, 2017 in 5 pages.

* cited by examiner

INTERLOCK DEVICE OF RING MAIN UNIT

CROSS-REFERENCE TO RELATED APPLICATIONS

This application claims the benefit of Korean Utility Model Application No. 20-2015-0004744, filed on Jul. 14, 2015, which is hereby incorporated by reference in its entirety.

BACKGROUND

Technical Field

The present disclosure relates to an interlock device of a ring main unit, and more particularly, to an interlock device of a ring main unit for controlling the attachment and detachment of a RISER circuit side cable cover provided in the ring main unit.

Description of the Related Art

In general, a ring main unit (RMU), as a device used to monitor, control and protect an electrical system used for receiving and distributing power sent from a switchboard to a customer, is configured with a collection including a breaker, a switchgear, a grounding and conductors, and the like within a structure sealed and insulated by $SF_6$ gas.

The ring main unit is provided with a CB circuit (breaker circuit), an LBS circuit (load break switch circuit), a fuse circuit, a RISER circuit, and the like within an enclosure, and a cable cover is attached thereto or detached therefrom to protect each circuit.

Figure 1:
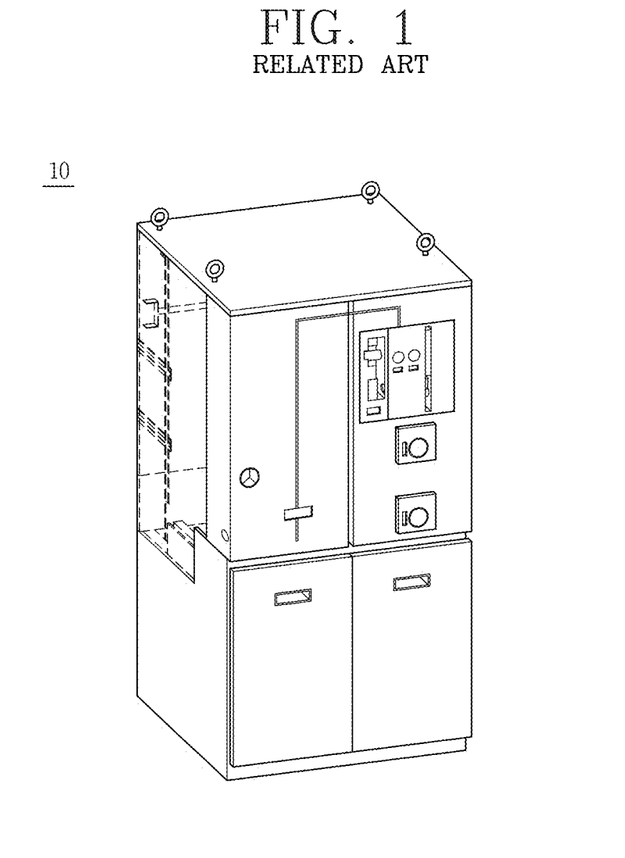
FIG. 1 is a perspective view illustrating a ring main unit according to the prior art.
Figure 2:
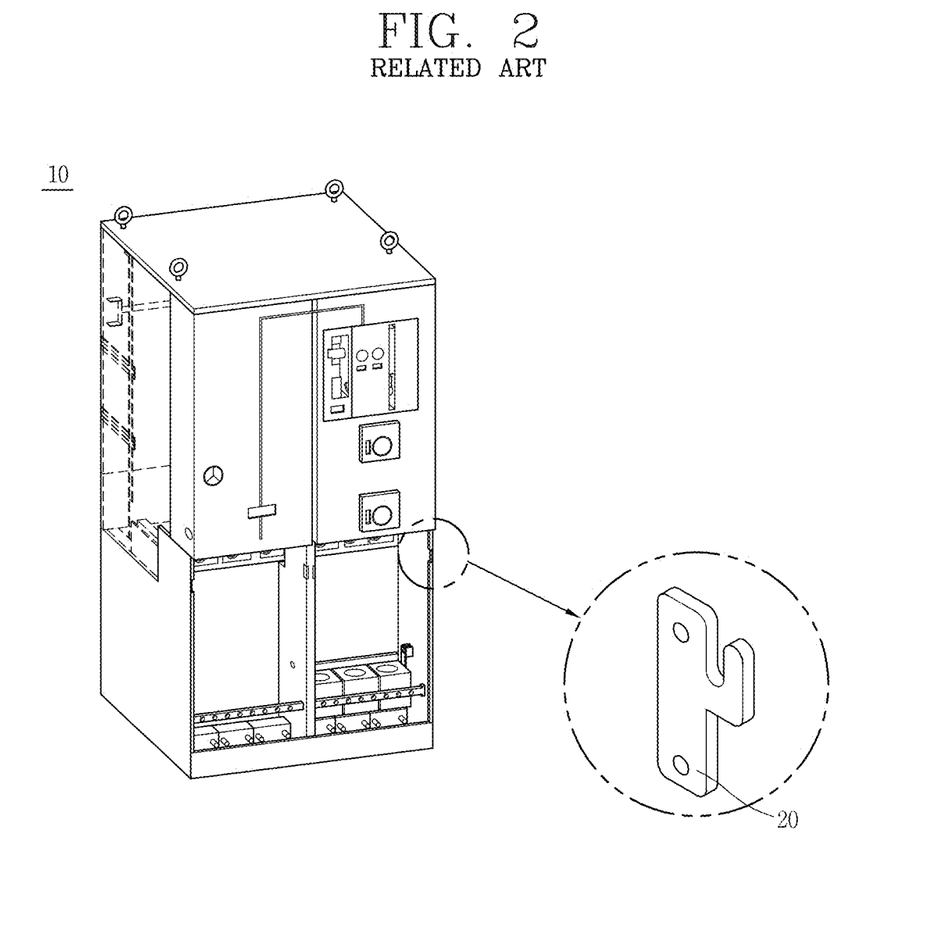
FIG. 2 is a partially enlarged view illustrating a state in which a holder is provided in a ring main unit according to the prior art.
Figure 3:
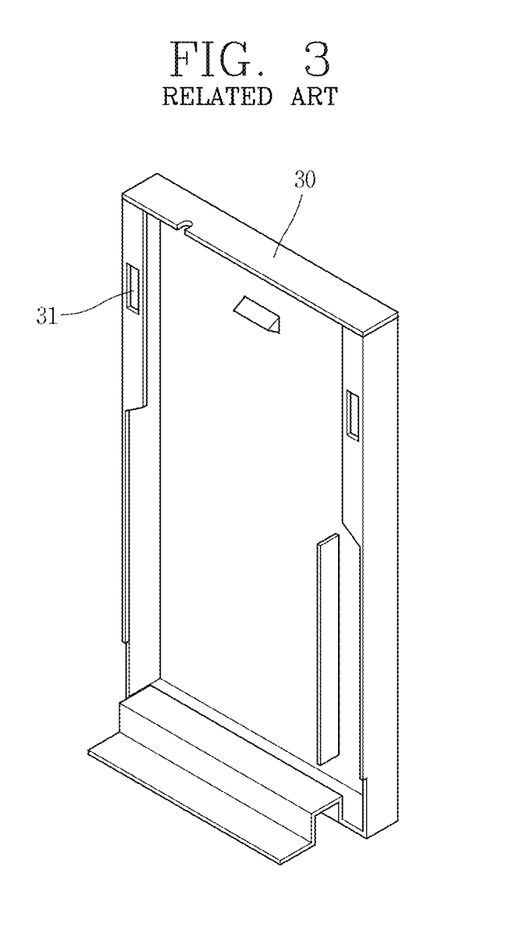
FIG. 3 is a perspective view illustrating a state in which an engagement hole is formed on a cable cover inserted into a ring main unit according to the prior art.
Figure 4A:
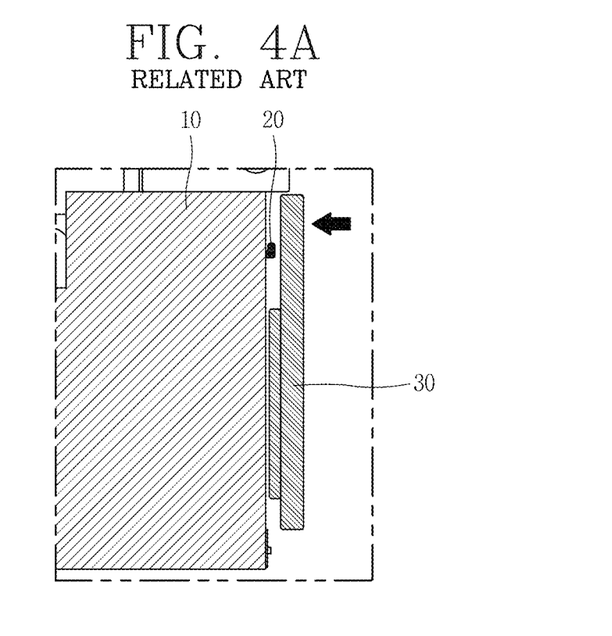
FIG. 4A is a schematic side view illustrating a state immediately before a cable cover is inserted into a ring main unit according to the prior art.
Figure 4B:
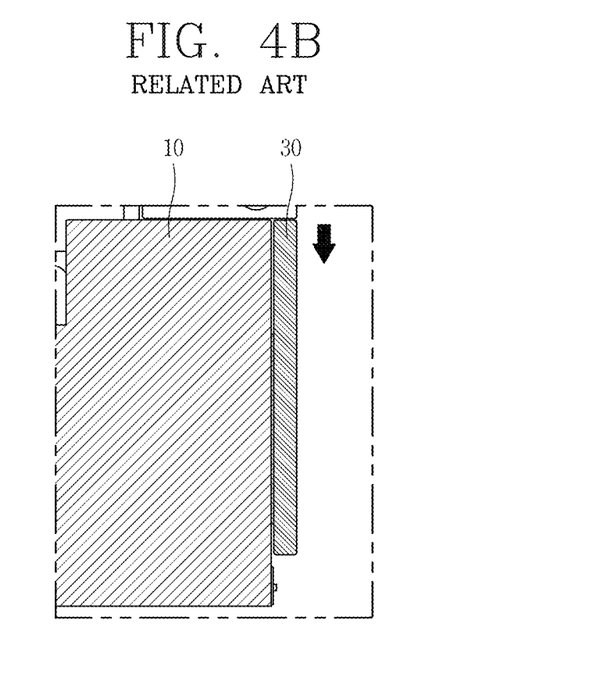
FIG. 4B is a schematic side view illustrating a state in which a holder provided in the ring main unit is inserted into an engagement hole of the cable cover according to the prior art.
Figure 4C:
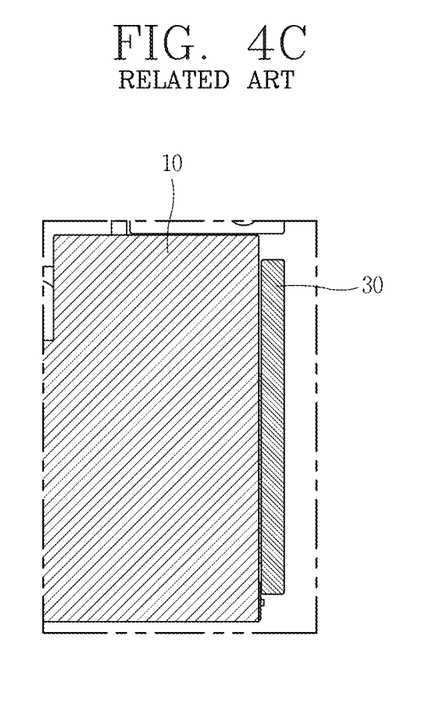
FIG. 4C is a schematic side view illustrating a state in which the cable cover is inserted into the ring main unit and then lowered in a downward direction according to the prior art.

On the other hand, FIG. 1 is a perspective view illustrating a ring main unit in the related art, and FIG. 2 is a partially enlarged view illustrating a state in which a holder is provided in a ring main unit in the related art, and FIG. 3 is a view illustrating a cable cover for protecting a breaker circuit of the ring main unit, and FIG. 4A is a schematic side view illustrating a state immediately before a cable cover is attached to a ring main unit, and FIG. 4B is a schematic side view illustrating a state in which the cable cover is attached to the ring main unit, and FIG. 4C is a schematic side view illustrating a state in which the cable cover is attached to the ring main unit and then moved in a downward direction.

As illustrated in FIGS. 1 through 3, a cable cover 30 is attached to or detached from a ring main unit 10 in the related art to protect each circuit.

Here, a holder 20 is provided within the ring main unit 10, and the cable cover 30 is inserted and fixed to the ring main unit 10 while the holder 20 is inserted into an engagement hole 31 formed on the cable cover 30.

In other words, as illustrated in FIGS. 4A through 4C, when the cable cover 30 is inserted into the ring main unit 10, the holder 20 is inserted into the engagement hole 31 formed on the cable cover 30, and when the cable cover 30 moves in a downward direction in a state of being inserted into the engagement hole 31, the separation of the cable cover 30 is prevented while an end of the holder 20 is placed at an upper side of the engagement hole 31.

On the other hand, a mechanism for operation is provided in a breaker circuit or load break switch circuit, and thus an interlock device is provided to control the attachment and detachment of the cable cover 30 according to the state of the mechanism, but a mechanism does not exist at a side of a RISER circuit of the ring main unit 10, and thus the interlock device is not provided to additionally control the attachment and detachment of the cable cover 30.

Accordingly, the cable cover 30 at a side of the RISER circuit may be detachable while the ring main unit 10 is conducting, thereby causing a problem in which safety accidents frequently occur for a user.

Furthermore, a user should move the cable cover 30 in a vertical direction each time during the attachment and detachment of cable cover 30, thereby causing a problem of significantly reducing the ease of use.

In addition, an impact may be applied to the ring main unit 10 during the attachment and detachment of the cable cover 30, thereby causing a problem of damaging components when used for a long period of time.

SUMMARY

Some embodiments of the present disclosure are directed to solving the foregoing problems, and an object of some embodiments of the present disclosure is to provide an interlock device of a ring main unit for controlling the attachment and detachment of a RISER circuit side cable cover provided in the ring main unit.

In some embodiments, the foregoing object of the present disclosure may be accomplished by providing an interlock device of a ring main unit attached to an inner frame of the ring main unit to control the attachment and detachment of a cable cover, and the interlock device may include a fixed portion fixed to the inner frame; an upper shaft bar provided to be surrounded by an elastic member, and formed with an elastic member compression platform to be protruded on an outer circumferential surface thereof to compress the elastic member or release the compression through the elastic member compression platform while moving in a vertical direction in a state of passing through the fixed portion; and a lower shaft bar connected to the upper shaft bar in an interlocking manner at a lower side of the upper shaft bar to move in interlocking with the cable cover in a state that the cable cover is inserted thereinto to compress the elastic member or release the compression through the upper shaft bar.

Furthermore, a movement prevention member may be provided between the upper shaft bar and the lower shaft bar.

Furthermore, an insertion hole and a fixed member coupled to the insertion hole may be provided on a front surface of the movement prevention member, and the fixed member may be brought into contact with the inner frame to prevent the detachment of the cable cover.

Furthermore, the fixed portion may include an upper plate formed with a through hole to move in a vertical direction through the upper shaft bar; a lateral plate extended in a downward direction from both ends of the upper plate; and a fixed plate extended from an end of the lateral plate in a lateral direction and formed with a fixed hole to fix the inner frame.

Furthermore, the elastic member compression platform may include any one of a cylindrical shape, a rod shape, a cam shape, and a plate shape.

Furthermore, a close contact groove may be formed at an upper portion of the cable cover, and the lower shaft bar may include a body portion; a close contact portion inserted into the close contact groove when coupled to the cable cover at an upper end of the body portion; and a connection platform extended to an upper side of the close contact portion and coupled to the movement prevention member.

Furthermore, a radial directional length of the close contact portion may be formed to be shorter than that of the body portion.

Furthermore, the close contact groove and the close contact portion may include the same curvature.

Furthermore, a plurality of protrusions may be formed on an outer circumferential surface of the fixed member to facilitate rotation.

Furthermore, the interlock device may further include a support portion, one end of which is connected to the fixed portion, and the other end of which is allowed for the upper shaft bar to pass therethrough to support the movement of the upper shaft bar.

Furthermore, the support portion may include a "Π"-shape.

Furthermore, a lock groove for locking a lock may be formed at a central portion of the movement prevention member.

As described above, an interlock device of a ring main unit according to some embodiments of the present disclosure may allow a cable cover to be attached thereto or detached therefrom using a spring, thereby including an effect of facilitating the attachment and detachment of the cable cover through an elastic force of the spring.

Furthermore, the attachment and detachment of a cable cover may be carried out through a spring, thereby preventing an impact from being applied to the ring main unit during the attachment and detachment of the cable cover.

Furthermore, a lock function may be provided using a lock, thereby including an effect of restricting an unauthorized person's access.

Furthermore, when a cable cover is attached thereto, a fixed member may be coupled thereto to restrict the detachment of the cable cover through the fixed member to allow a user to recheck whether or not the ring main unit is conducting and then detach the cable cover, thereby including an effect of preventing a safety accident in advance from occurring during the use thereof.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Hereinafter, an interlock device of a ring main unit according to embodiments of the present disclosure will be described in detail with reference to the accompanying drawings.

Figure 5:
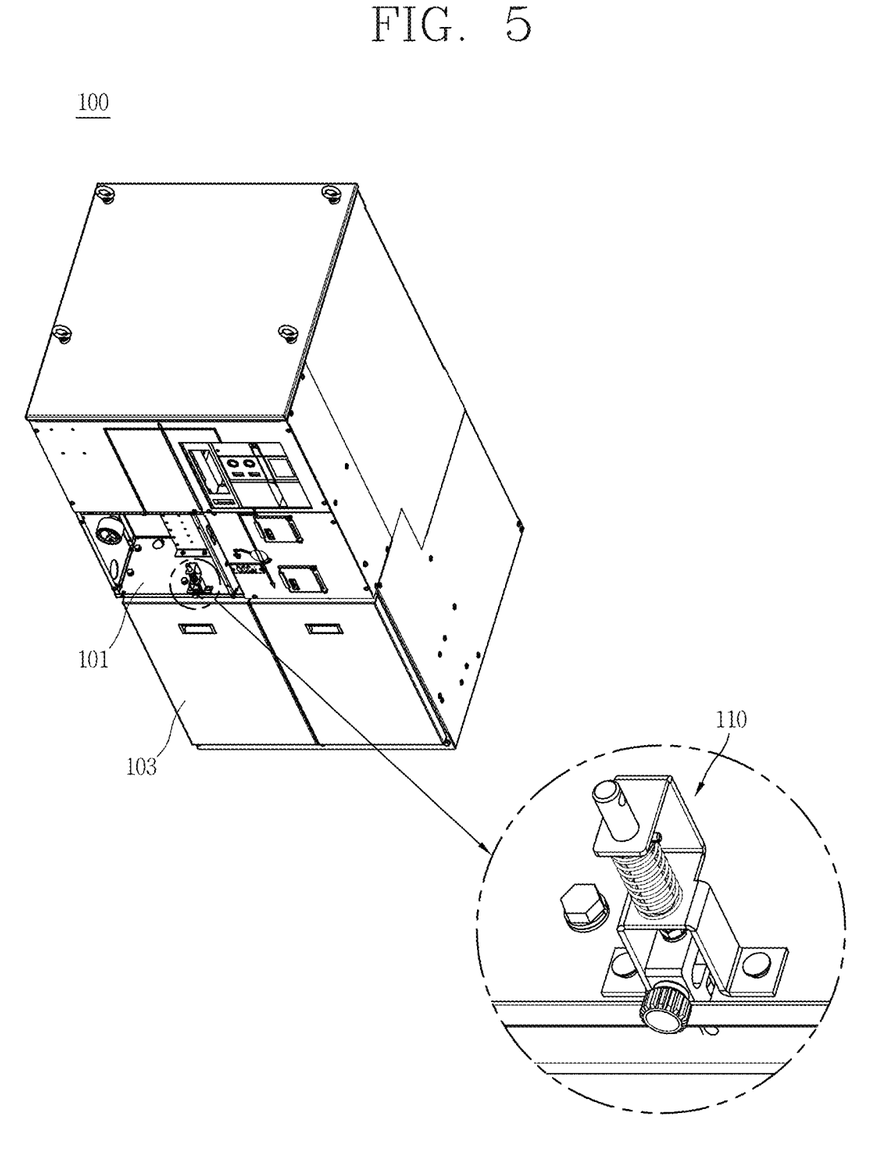
FIG. 5 is a partially enlarged view illustrating a state in which an interlock device according to some embodiments of the present disclosure is attached to a ring main unit.
Figure 6:
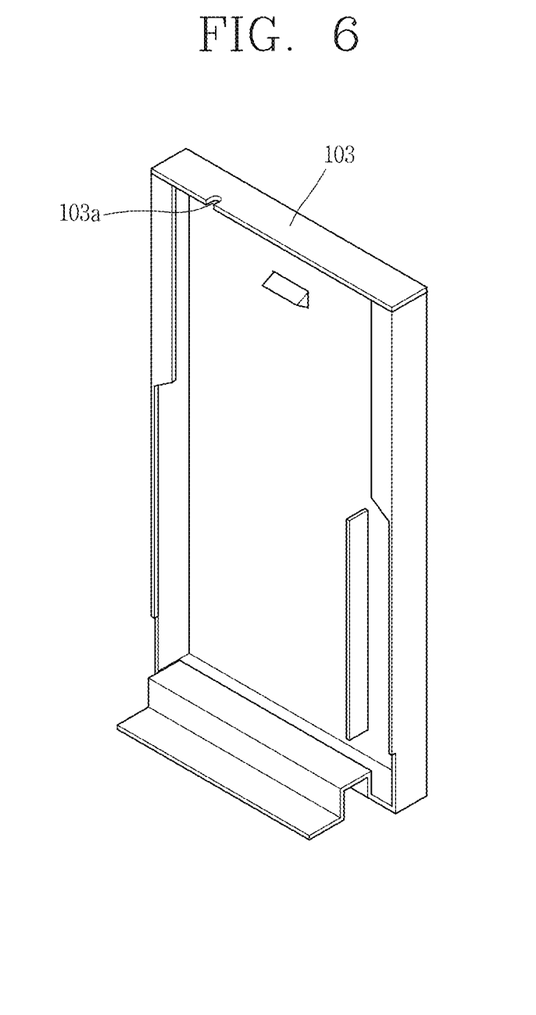
FIG. 6 is a perspective view illustrating a cable cover, the attachment and detachment of which is controlled through an interlock device according to some embodiments of the present disclosure.
Figure 7:
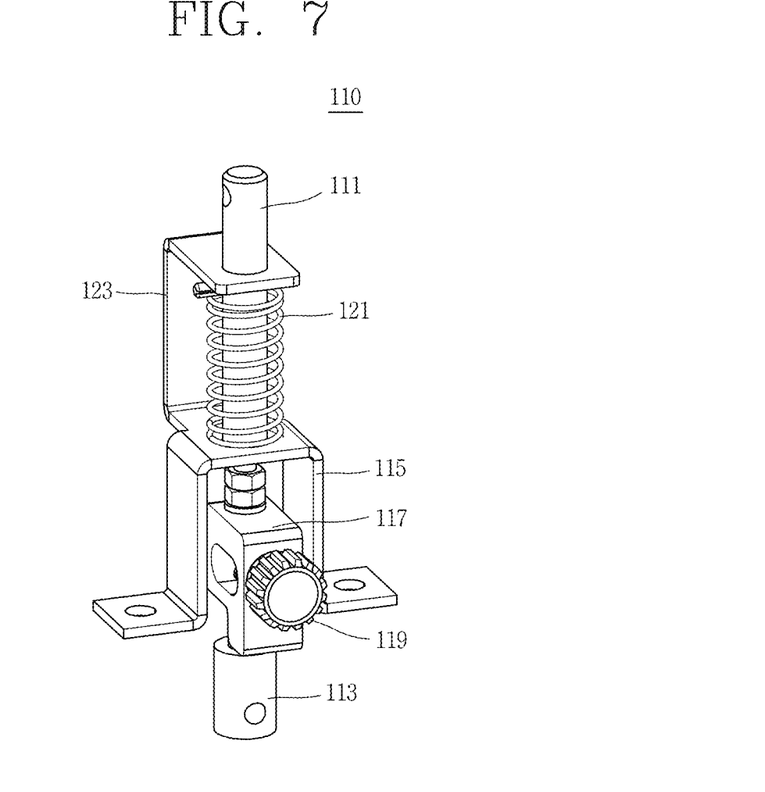
FIG. 7 is a perspective view illustrating an interlock device according to some embodiments of the present disclosure.
Figure 8:
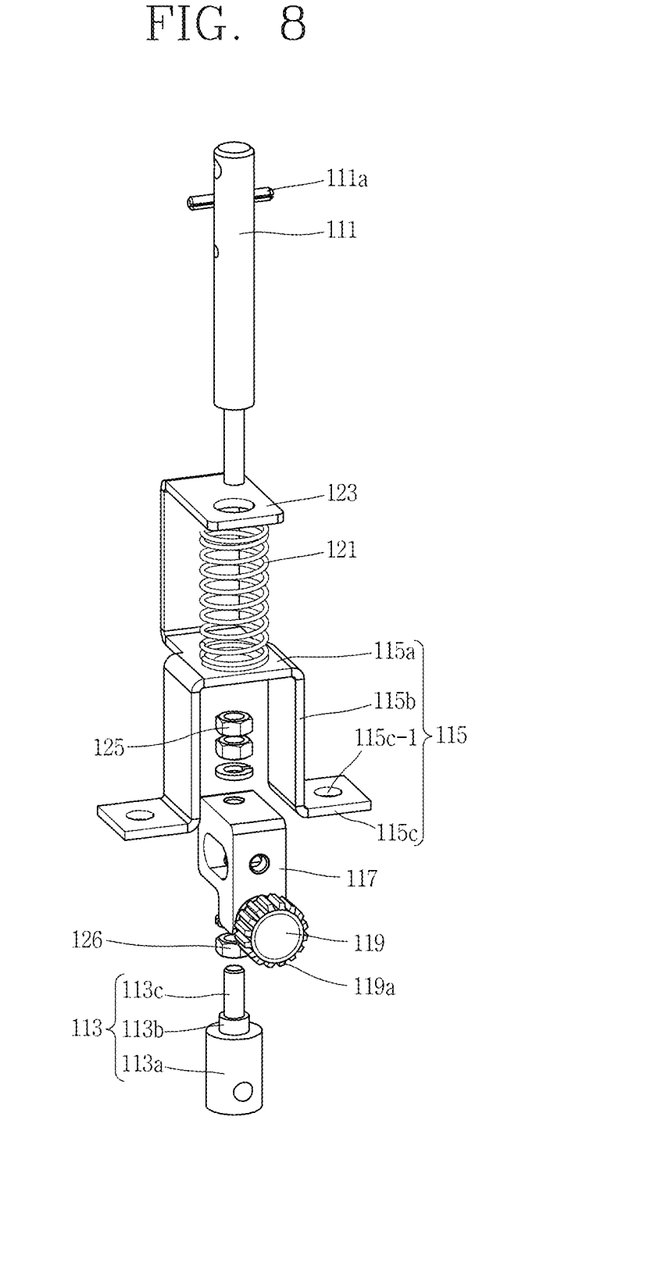
FIG. 8 is an exploded perspective view illustrating an interlock device according some embodiments of to the present disclosure.
Figure 9:
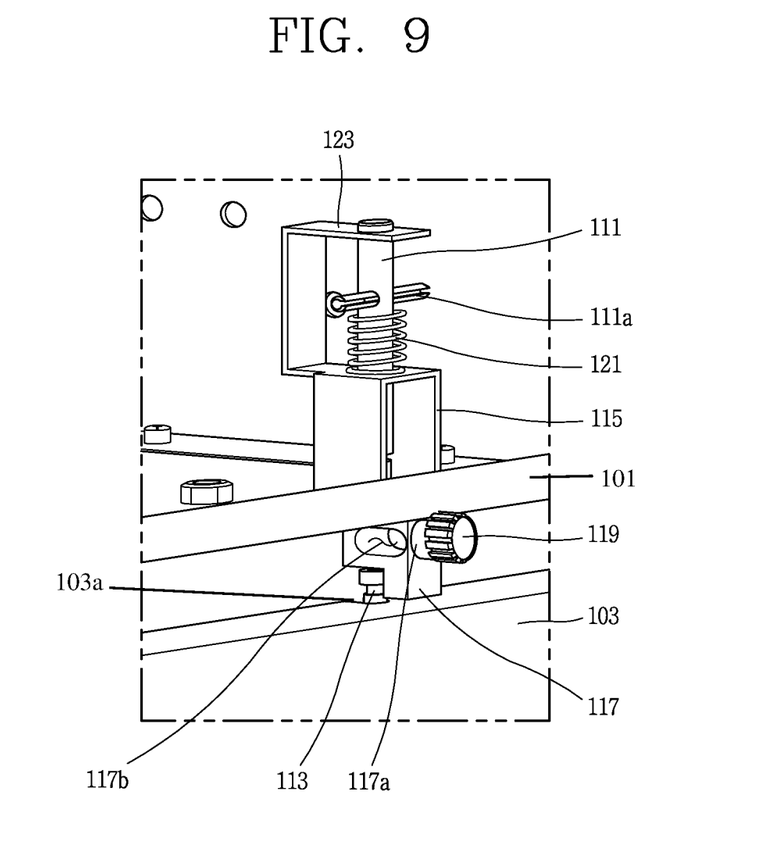
FIG. 9 is another perspective view illustrating an interlock device according to some embodiments of the present disclosure.

FIG. 5 is a partially enlarged view illustrating a state in which an interlock device according to some embodiments of the present disclosure is attached to a ring main unit, and FIG. 6 is a perspective view illustrating a cable cover, the attachment and detachment of which is controlled through an interlock device according to some embodiments of the present disclosure, and FIG. 7 is a perspective view illustrating an interlock device according to some embodiments of the present disclosure, and FIG. 8 is an exploded perspective view illustrating an interlock device according to some embodiments of the present disclosure, and FIG. 9 is another perspective view illustrating an interlock device according to some embodiments of the present disclosure.

As illustrated in FIG. 5 through 8, an interlock device 110 of a ring main unit according to some embodiments of the present disclosure is attached to an inner frame 101 of a ring main unit 100 to control the attachment and detachment of a RISER circuit side cable cover 103 in the ring main unit 100.

Here, the interlock device 110 may include an upper shaft bar 111, a fixed portion 115, and a lower shaft bar 113.

The upper shaft bar 111 is made in a cylindrical shape, and formed to be surrounded by an elastic member 121 such as a spring.

Furthermore, an elastic member compression platform 111a is formed in a protruding manner on an outer circumferential surface thereof, and a lower surface of the elastic member compression platform 111a is placed at an upper end of the elastic member 121 in a closely contacted state.

Accordingly, when the upper shaft bar 111 moves, the elastic member compression platform 111a compresses the elastic member 121 or releases the compression.

Here, the elastic member compression platform 111a may be formed in various shapes such as a cam shape, a cylindrical shape or a plate shape.

The fixed portion 115 is fixed to allow the upper shaft bar 111 to move in a vertical direction therethrough.

Here, the fixed portion 115 may include an upper plate 115a, a lateral plate 115b, and a fixed plate 115c.

The upper plate 115a is located in a horizontal direction to the inner frame 101, and a through hole (not shown) is formed to allow the upper shaft bar 111 to move therethrough, and the upper shaft bar 111 moves in a state of being inserted into the through hole.

The lateral plate 115b is extended to a lower side of the upper plate 115a from both ends of the upper plate 115a, and the fixed plate 115c is extended from an end of the lateral plate 115b in a lateral direction and formed with a fixed hole 115c-1 to fix the inner frame 101, and a connection member (not shown) such as a rivet passes through the fixed hole 115c-1 and the inner frame 101 to allow the interlock device 110 to be fixed to the inner frame 101 through the fixed plate 115c.

In addition, the fixed portion 115 may include a support portion 123 in a "Π"-shape to support the movement of the upper shaft bar 111, an end of the support portion 123 is connected to the fixed portion 115, and the other end thereof is allowed for an upper portion of the upper shaft bar 111 to pass therethrough to support the movement of the upper shaft bar 111.

The lower shaft bar 113 is connected to the upper shaft bar 111 in an interlocking manner at a lower side of the upper shaft bar 111, and the cable cover 103 moves in interlocking with the cable cover 103 in a state that the cable cover 103 is inserted thereinto to compress the elastic member 121 or release the compression through the upper shaft bar 111.

Here, a close contact groove 103a is formed at an upper end of the cable cover 103, and the lower shaft bar may include a body portion 113a, a close contact portion 113b, and a connection platform 113c.

The body portion 113a is made in a cylindrical shape, the close contact portion 113b is protruded at an upper end of the body portion 113a and inserted into the close contact groove 103a when coupled to the cable cover 103.

Here, the close contact groove 103a and the close contact portion 113b are formed to include the same curvature, and when the close contact portion 113b is inserted into the close contact groove 103a, an outer circumferential surface of the close contact portion 113b is brought into contact with the close contact groove 103a.

Furthermore, a radial directional length of the close contact portion 113b is formed to be shorter than that of the body portion 113a, when coupled to the cable cover 103, the body portion 113a is also moved according to the movement of the cable cover 103 while a predetermined portion of the body portion 113a is brought into contact with a lower surface of an upper end of the cable cover 103.

The connection platform 113c is extended to an upper side of the close contact portion 113b and inserted into a lower portion of the movement prevention member 117 which will be described below.

On the other hand, the movement prevention member 117 for connecting the upper shaft bar 111 and the lower shaft bar 113 is further provided between the upper shaft bar 111 and the lower shaft bar 113.

The movement prevention member 117 is connected between the upper shaft bar 111 and the lower shaft bar 113 to move the upper shaft bar 111 and the lower shaft bar 113 in an interlocking manner according to the movement of the cable cover 103.

In other words, a lower end of the upper shaft bar 111 is inserted into an upper end of the movement prevention member 117 and connected thereto through a first fastening member 125, and an upper end of the lower shaft bar 113 is inserted into a lower end of the movement prevention member 117 and connected to thereto through a second fastening member 126, and thus the upper shaft bar 111 and the lower shaft bar 113 move in an interlocking manner through the movement prevention member 117.

Accordingly, when moved in a state that the cable cover 103 is inserted into the lower shaft bar 113, the upper shaft bar 111 connected to the lower shaft bar 113 through the movement prevention member 117 is also moved downward while at the same time moving the lower shaft bar 113, and the elastic member compression platform 111a compresses the elastic member 121 according to the movement of the upper shaft bar 111.

Then, when the elastic member 121 presses the elastic member compression platform 111a while being restored to an original position through an elastic restoring force during the separation of the cable cover 103, the upper shaft bar 111, the movement prevention member 117 and the lower shaft bar 113 move the cable cover 103 at the same time while moving upward to easily carry out the separation of the cable cover 103 without applying a large force, thereby preventing an impact from being applied to the ring main unit 100 during the separation of the cable cover 103 since a large force is not applied thereto.

Furthermore, as illustrated in FIG. 9, an insertion hole 117a is formed on a front surface of the movement prevention member 117, and when the cable cover 103 moves in a downward direction in a state that the close contact portion 113b is inserted into the close contact groove 103a, and the insertion hole 117a is placed at a lower side of the inner frame 101 while at the same time the movement prevention member 117 also moves in interlocking with the lower shaft bar 113.

At this time, when the fixed member 119 is inserted into the insertion hole 117a, an upper end of the fixed member 119 is closely contacted with a lower end of the inner frame 101 to restrict the movement of the inner frame 101 in an upward direction, thereby preventing the detachment of the cable cover 103.

In addition, a lock groove 117b for locking a lock is further formed at a central portion of the movement prevention member 117 to restrict an unauthorized person's use.

On the other hand, the fixed member 119 is inserted into the insertion hole 117a to restrict the movement of the cable cover 103, and a object protrusions 119a are formed on an outer circumferential surface of the fixed member 119, thereby facilitating rotation through the protrusions 119a when a user couples the fixed member 119 to the insertion hole 117a while rotating the fixed member 119.

In case of the present disclosure including the foregoing configuration, the cable cover 103 may be attached thereto or detached therefrom using a spring, thereby facilitating the attachment and detachment of the cable cover 103 through an elastic force of the spring.

Furthermore, the attachment and detachment of the cable cover 103 may be carried out through a spring, thereby preventing an impact from being applied to the ring main unit 100 during the attachment and detachment of the cable cover 103.

Furthermore, a lock function may be provided using a lock, thereby restricting an unauthorized person's access.

Furthermore, when the cable cover 103 is attached thereto, the fixed member 119 may be coupled thereto to restrict the detachment of the cable cover 103 through the fixed member 119 to allow a user to recheck whether or not the ring main unit 100 is conducting and then detach the cable cover 103, thereby preventing a safety accident in advance from occurring during the use thereof.

Though a embodiment of the present disclosure includes been described in the above, it will be apparent to those skilled in the art that various alternatives, changes and equivalents can be used for the present disclosure and the above embodiment is modified in an appropriate manner and applied thereto in the same manner. Accordingly, the disclosure is not intended to limit the scope of the disclosure as defined by the limitation of the following claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An interlock device of a ring main unit configured to be attached to an inner frame of the ring main unit to control an attachment and detachment of a cable cover, the interlock device comprising:
    a fixed portion configured to be fixed to an inner frame;
    an upper shaft bar configured to be surrounded by an elastic member, and including an elastic member compression platform to be protruded on an outer circumferential surface to compress the elastic member or release a compression through to the elastic member compression platform while moving in a vertical direction in a state of passing through the fixed portion; and
    a lower shaft bar configured to be connected to the upper shaft bar in an interlocking manner at a lower side of the upper shaft bar to move in interlocking with the cable cover in a state that the cable cover is inserted thereinto to compress the elastic member or release the compression through the upper shaft bar,
    wherein a movement prevention member is provided between the upper shaft bar and the lower shaft bar,
    wherein an insertion hole is provided on a front surface of the movement prevention member, and
    wherein when the insertion hole is placed below the inner frame and a fixed member is coupled to the insertion hole, the fixed member is configured to be contacted with the inner frame to prevent the detachment of the cable cover.

2. The interlock device of claim 1, wherein the fixed portion comprises:
    an upper plate including a through hole to move in a vertical direction through the upper shaft bar;
    a lateral plate extended in a downward direction from both ends of the upper plate; and
    a fixed plate extended from an end of the lateral plate in a lateral direction and including a fixed hole to fix the inner frame.

3. The interlock device of claim 1, wherein the elastic member compression platform includes any one of: a cylindrical shape, a rod shape, a cam shape, or a plate shape.

4. The interlock device of claim 1, wherein a close contact groove is disposed at an upper portion of the cable cover, and
    wherein the lower shaft bar comprises:
        a body portion;
        a close contact portion configured to be inserted into the close contact groove when coupled to the cable cover at an upper end of the body portion; and
        a connection platform extended to an upper side of the close contact portion and configured to be coupled to a movement prevention member.

5. The interlock device of claim 4, wherein a radial directional length of the close contact portion is shorter than that of the body portion.

6. The interlock device of claim 4, wherein the close contact groove and the close contact portion include a same curvature.

7. The interlock device of claim 1, wherein a plurality of protrusions are disposed on the outer circumferential surface of the fixed member to facilitate rotation.

8. The interlock device of claim 1, further comprising:
    a support portion, one end of which is configured to be connected to the fixed portion, and the other end of which is configured to allow for the upper shaft bar to pass therethrough to support a movement of the upper shaft bar.

9. The interlock device of claim 8, wherein the support portion includes a "Π"-shape.

10. The interlock device of claim 1, wherein a lock groove for locking a lock is disposed at a central portion of the movement prevention member.

* * * * *